(12) United States Patent
Waldrop et al.

(10) Patent No.: US 8,464,590 B2
(45) Date of Patent: Jun. 18, 2013

(54) PRESSURE SENSOR CONFIGURATION FOR PRESSURIZED TANK

(75) Inventors: Mark Stanley Waldrop, Mt. Baldy, CA (US); James Lee Geer, Gavilan Hills, CA (US)

(73) Assignee: Cameron International Corporation, Houston, TX (US)

( * ) Notice: Subject to any disclaimer, the term of this patent is extended or adjusted under 35 U.S.C. 154(b) by 301 days.

(21) Appl. No.: 12/884,757

(22) Filed: Sep. 17, 2010

(65) Prior Publication Data

US 2012/0067133 A1    Mar. 22, 2012

(51) Int. Cl.
*G01L 9/00*    (2006.01)
*G01L 27/00*    (2006.01)

(52) U.S. Cl.
USPC .................... 73/753; 73/1.57; 73/1.72

(58) Field of Classification Search
None
See application file for complete search history.

(56) References Cited

U.S. PATENT DOCUMENTS

| | | | |
|---|---|---|---|
| 5,309,764 A | 5/1994 | Waldrop et al. | |
| 5,629,477 A * | 5/1997 | Ito | 73/114.39 |
| 5,718,210 A * | 2/1998 | Ito et al. | 123/520 |
| 5,780,729 A * | 7/1998 | Escobar | 73/118.01 |
| 6,435,164 B1 * | 8/2002 | Kaiser et al. | 123/516 |
| 6,542,848 B1 | 4/2003 | Neeser et al. | |
| 6,675,641 B2 * | 1/2004 | Gehner et al. | 73/114.42 |
| 7,080,548 B2 * | 7/2006 | Nakoji | 73/114.39 |
| 7,168,302 B2 * | 1/2007 | Nakoji | 73/114.39 |
| 7,168,303 B2 * | 1/2007 | Takahashi et al. | 73/114.39 |
| 7,323,858 B2 * | 1/2008 | Hein | 324/71.1 |
| 7,360,408 B2 * | 4/2008 | Dingler et al. | 73/118.01 |
| 7,409,855 B2 * | 8/2008 | Flint | 73/114.39 |
| 7,536,251 B2 * | 5/2009 | Saito et al. | 701/104 |
| 7,805,259 B2 * | 9/2010 | Furuse | 702/35 |
| 8,166,795 B2 * | 5/2012 | Gehlhoff et al. | 73/1.72 |
| 2003/0056565 A1 | 3/2003 | Barbe | |
| 2005/0103092 A1 | 5/2005 | Chiarito et al. | |
| 2006/0031000 A1 | 2/2006 | Amano et al. | |
| 2007/0151350 A1 | 7/2007 | Sheldon | |

FOREIGN PATENT DOCUMENTS

JP    2002303200 A  * 10/2002

OTHER PUBLICATIONS

International Search Report and Written Opinion dated Mar. 16, 2012 for corresponding PCT Application No. PCT/US2011/048551 filed Aug. 22, 2011.
Cameron; Measurement Systems; Barton; CryoScan 51; (undated); (4 p.).

* cited by examiner

*Primary Examiner* — Lisa Caputo
*Assistant Examiner* — Jermaine Jenkins
(74) *Attorney, Agent, or Firm* — Chamberlain Hrdlicka

(57) ABSTRACT

In at least some embodiments, a pressure sensor configuration includes a pressure sensor and a switchable valve coupled to the pressure sensor. The switchable valve enables the pressure sensor to measure pressure at multiple ports of a pressurized tank.

22 Claims, 9 Drawing Sheets

PRESSURE SENSOR CONFIGURATION FOR PRESSURIZED TANK

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Pressure sensors have various applications. As an example, pressure sensors have been used to determine parameters (e.g., level, volume, mass) of liquid in a pressurized liquid storage tank. FIGS. 1-4 show various existing pressure sensor configurations for this application.

FIG. 1 shows a pressure sensor configuration 100 comprising a pressurized tank 102 coupled to a pressure sensor 104 and a differential pressure sensor 106 via pressure piping. The pressure sensor 104 measures pressure at the top (HI) port of the tank 102 (compared to vacuum or atmospheric pressure) and the differential pressure sensor 106 measures a difference in pressure between the HI port and LO port of the tank 102. The pressure measurements from the pressure sensor 104 and the differential pressure sensor 106 are provided to an electronics/communication module 108 via electrical wiring. The electronics/communication module 108 processes the pressure measurements from the pressure sensor 104 and the differential pressure sensor 106 and/or forwards these pressure measurements to a remote computer for processing.

In FIG. 2, a pressure sensor configuration 200 is shown with a combo pressure/differential pressure (PDP) sensor 204 coupled to the tank 102 via pressure piping. The combo PDP sensor 204 comprises a pressure sensor and a differential pressure sensor integrated into a single unit to reduce cost and complexity. The combo PDP sensor 204 measures pressure at the HI port of the tank 102 (compared to vacuum or atmospheric pressure) and measures a difference in pressure between the HI port and the LO port of the tank 102. The pressure measurements from the combo PDP sensor 204 are provided to an electronics/communication module 208 via electrical wiring. The electronics/communication module 208 processes the pressure measurements from the combo PDP sensor 204 and/or forwards these pressure measurements to a remote computer for processing.

In FIG. 3, a pressure sensor configuration 300 is shown with the differential pressure sensor 106 coupled to the tank 102 via pressure piping. The differential pressure sensor 106 measures a difference in pressure between the HI port and the LO port of the tank 102. The pressure measurements from the differential pressure sensor 106 are provided to an electronics/communication module 308 via electrical wiring. The electronics/communication module 308 processes the pressure measurements from the differential pressure sensor 106 and/or forwards the pressure measurements to a remote computer for processing.

In the pressure sensor configuration 300, the differential pressure sensor 106 measures level. This sensor must handle the high static pressure of the tank, but the difference in pressure between the inputs may be limited to a lower pressure (eg twice the differential pressure range). This means that if a user connected the HI or LO port on the tank to the transmitter with the other side vented to atmosphere, the sensor would be damaged. Using a more complex differential pressure sensor or separate overpressure device is possible, but increases cost. Sensor configuration 300 is less costly than configurations 100 and 200, but does not provide measurement of tank pressure.

In FIG. 4, a pressure sensor configuration 400 is shown with two pressure sensors 104A and 104B coupled to the tank 102 via pressure piping. There is no differential pressure sensor in pressure sensor configuration 400. However, differential pressure is determinable by subtracting the pressure measurement of pressure sensor 104A from the pressure measurement of pressure sensor 104B (or vice versa). Using two pressure sensors 104A and 104B as in pressure sensor configuration 400 significantly magnifies measurement errors that occur due to temperature effect or other ambient effects because each pressure sensor 104A and 104B responds differently. For example, the differential pressure is calculated as: $DP=P_{HI}+E_{HI}-(P_{LO}+E_{LO})$, where $P_{HI}$ is the pressure at the HI port of the tank 102, $E_{HI}$ is the measurement error in $P_{HI}$, $P_{LO}$ is the pressure at the LO port of the tank 102, and $E_{LO}$ is the measurement error in $P_{LO}$. If $E_{HI}$ and $E_{LO}$ are large and in opposite directions, the accuracy of the differential pressure calculation suffers. The pressure measurements from the pressure sensors 104A and 104B are provided to an electronics/communication module 408 via electrical wiring. The electronics/communication module 408 processes the pressure measurements from the pressure sensors 104A and 104B and/or forwards these pressure measurements to a remote computer for processing.

SUMMARY OF THE PREFERRED EMBODIMENTS

In at least some embodiments, a pressure sensor configuration includes a pressure sensor and a switchable valve coupled to the pressure sensor. The switchable valve enables the pressure sensor to measure pressure at multiple ports of a pressurized tank.

In at least some embodiments, a remote telemetry unit (RTU) includes a pressure sensor and a solenoid valve coupled to the pressure sensor. The RTU operates the solenoid valve in conjunction with measurements of the pressure sensor to determine a differential pressure of a pressurized tank.

In at least some embodiments, a method includes receiving, by an RTU, a first measurement from a pressure sensor while connected to a first pressure pipe connection. The method also includes receiving, by the RTU, a second measurement from the pressure sensor while connected to a second pressure pipe connection. The method also includes calculating, by the RTU, a differential pressure based on the first and second measurements.

BRIEF DESCRIPTION OF THE DRAWINGS

For a more detailed description of the embodiments, reference will now be made to the following accompanying drawings.

DETAILED DESCRIPTION OF THE PREFERRED EMBODIMENTS

Figure 1:
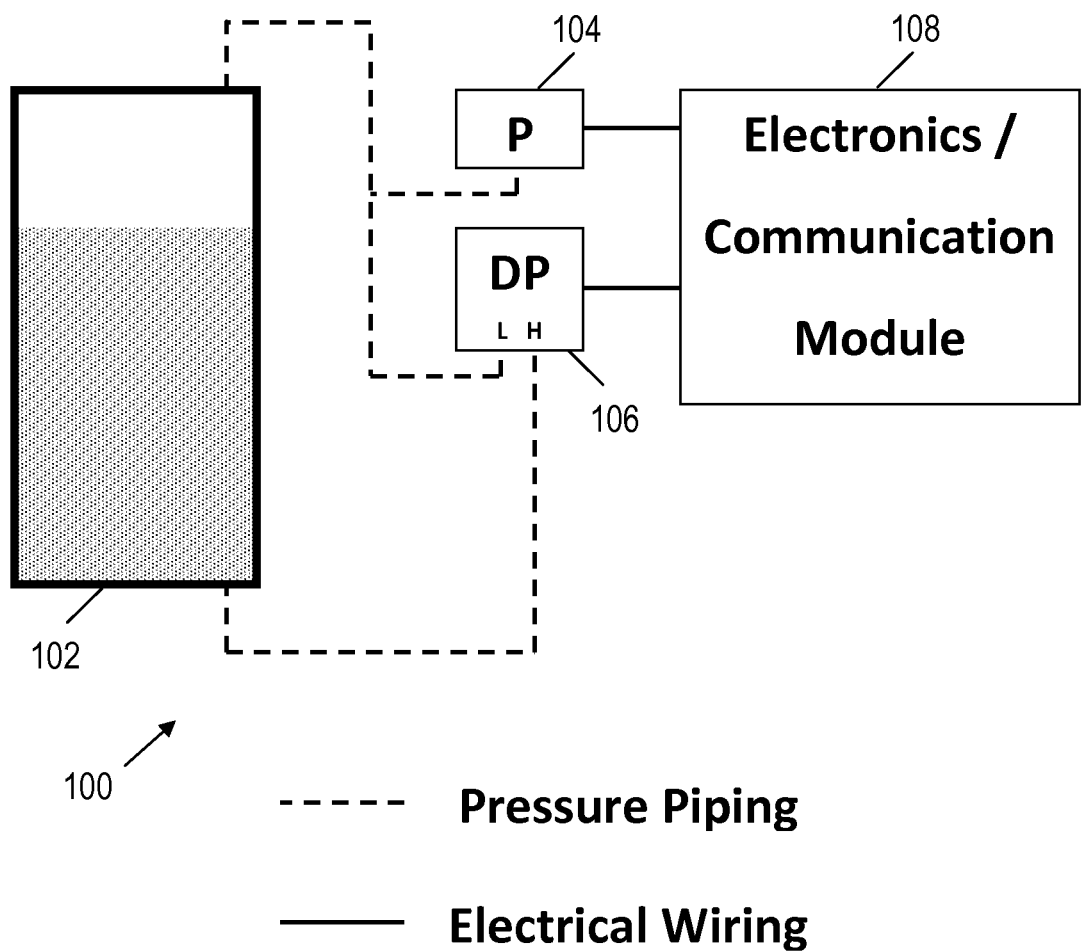
FIGS. 1-4 show various existing pressure sensor configurations.
Figure 2:
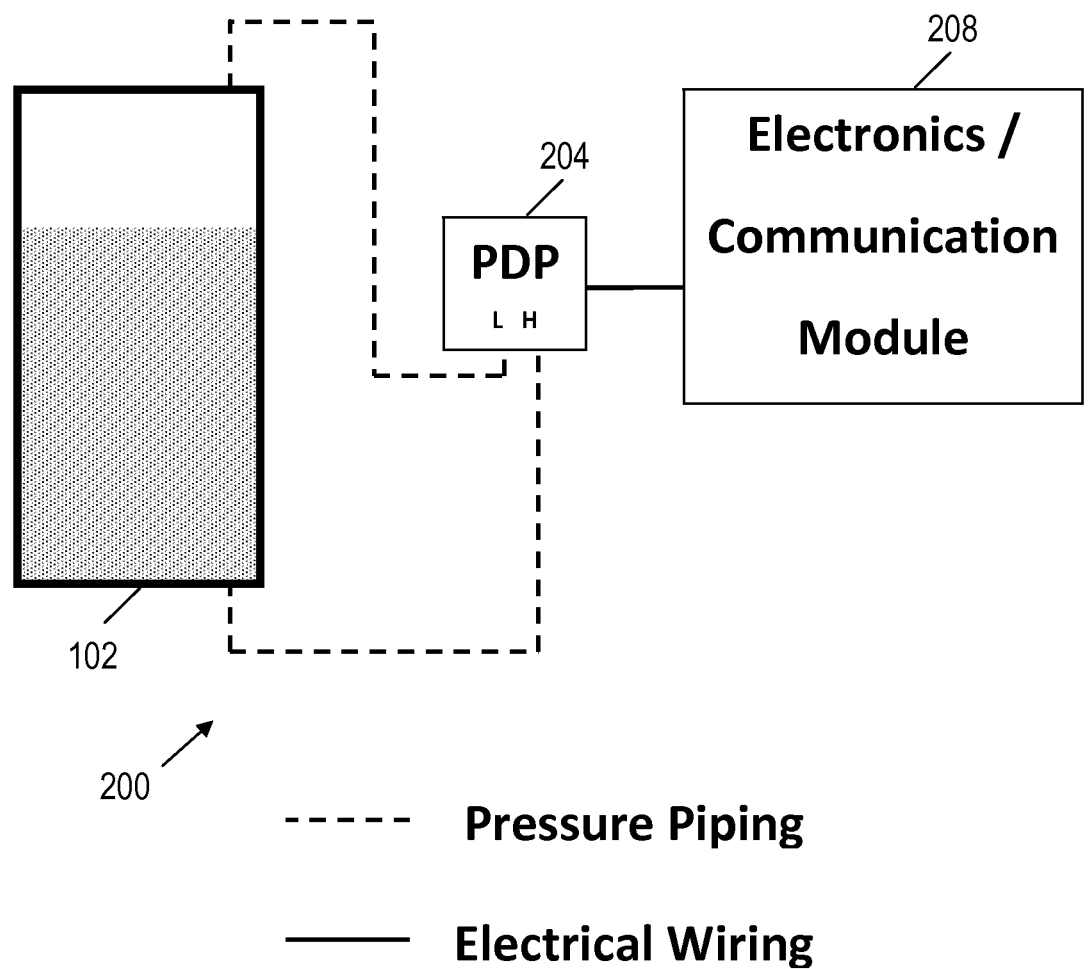
Figure 3:
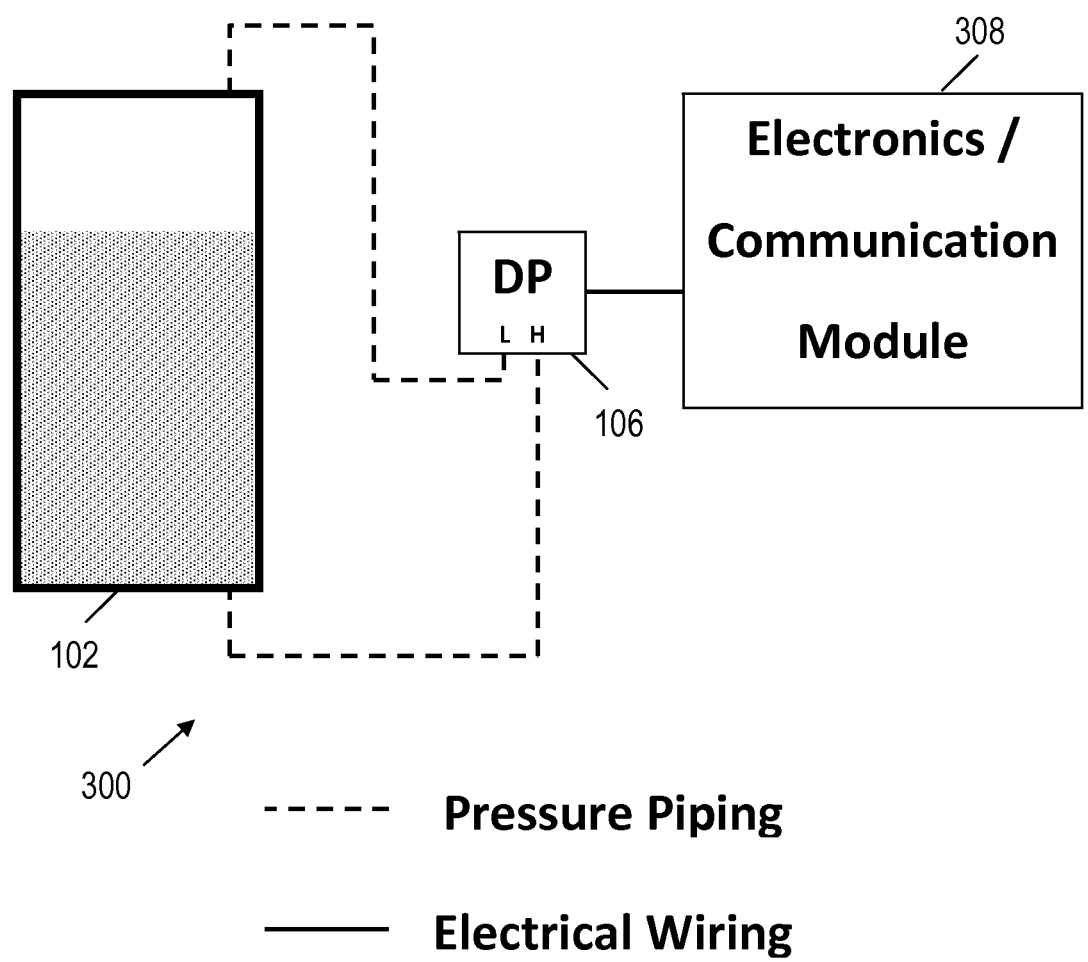
Figure 4:
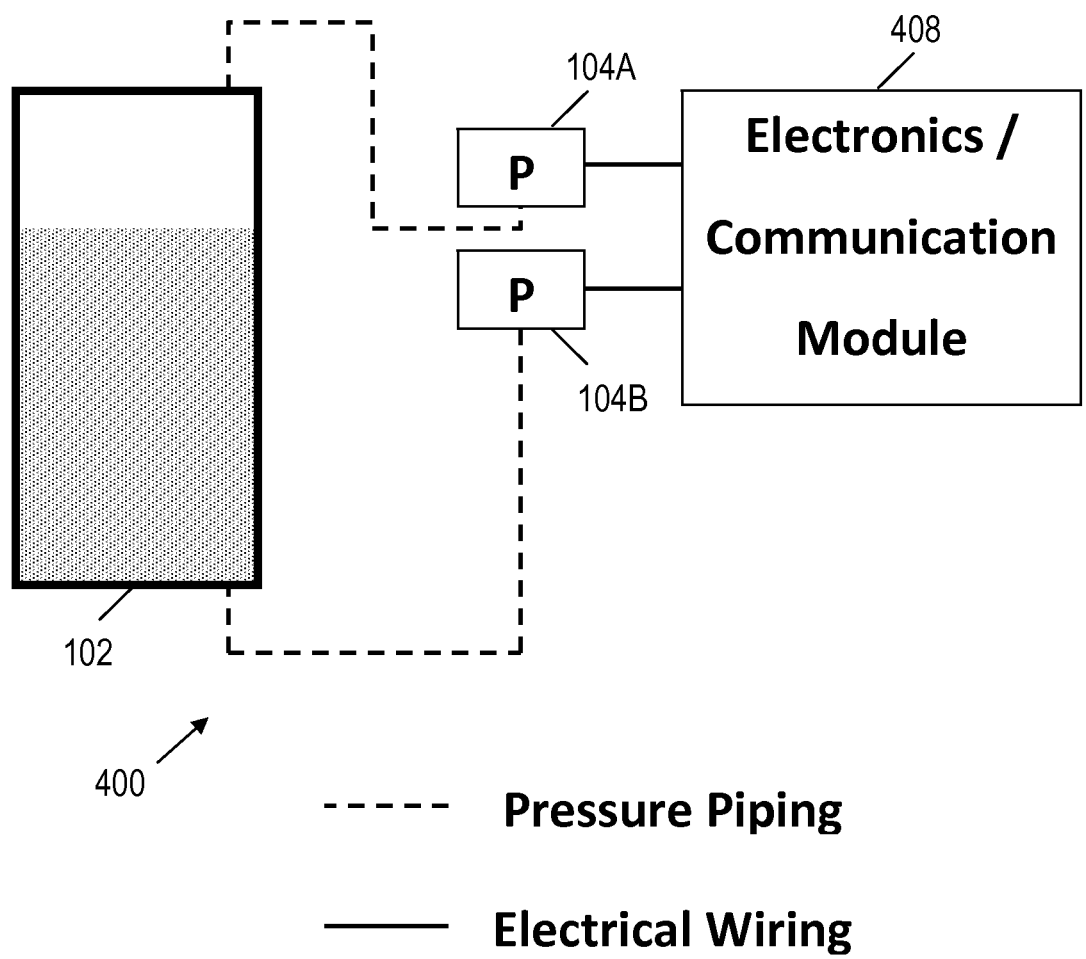

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. Any use of any form of the terms "connect", "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Figure 5:
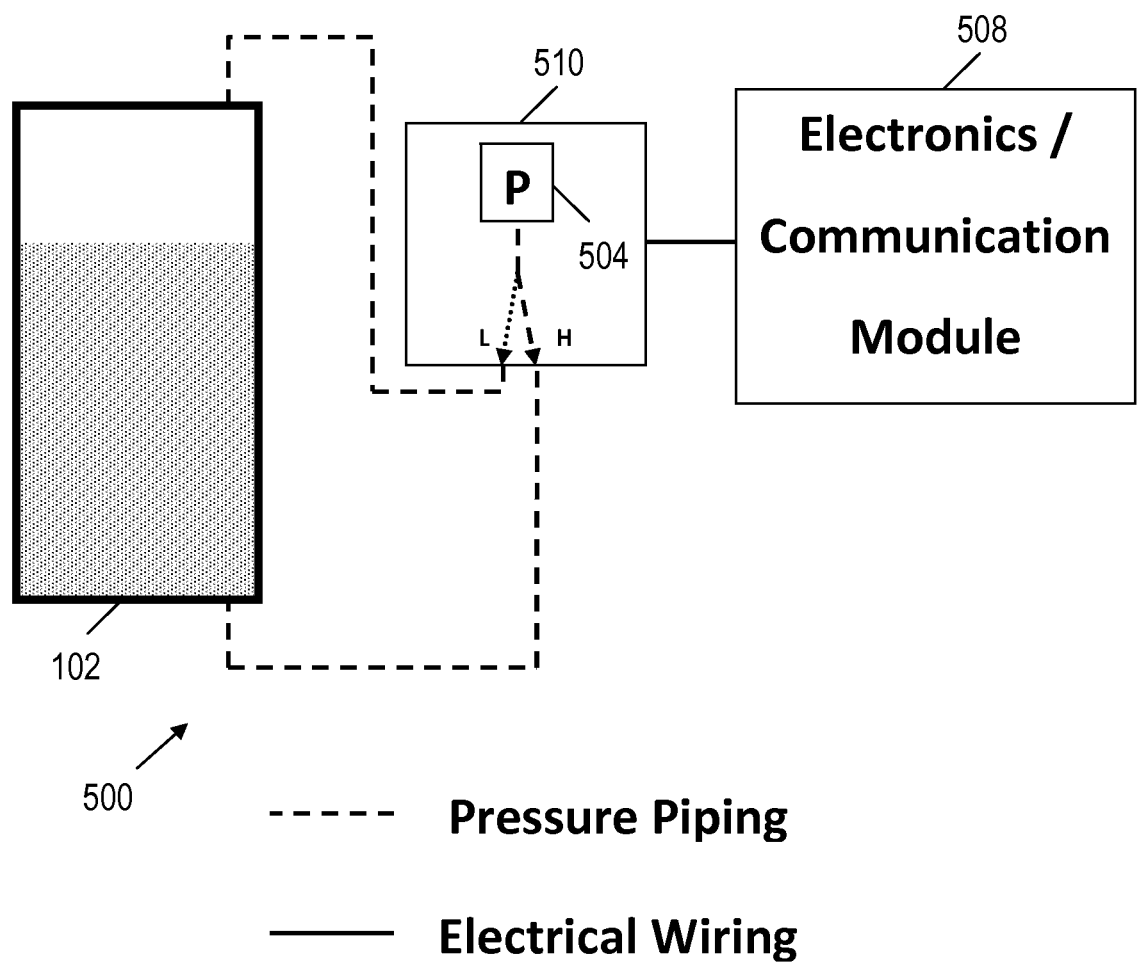
FIG. 5 shows a pressure sensor configuration in accordance with an embodiment of the disclosure.

FIG. 5 shows a pressure sensor configuration 500 in accordance with an embodiment of the disclosure. For example, the pressure sensor configuration 500 may be implemented to determine the level, volume and/or mass of liquid in a pressurized liquid (e.g., cryogenic) storage tank 102. In configuration 500, a switchable pressure sensor (SPS) unit 510 comprises a pressure sensor 504 that selectively couples to the HI port or the LO port of the tank 102 via pressure piping. The pressure sensor 504 is constructed from 316 SST, brass, copper, or anodized aluminum wetted parts with Flourinert fill (or equivalent). The SPS unit 510 may utilize a solenoid valve to switch connection of the pressure sensor 504 between the HI port and the LO port (or vice versa) of tank 102.

The pressure measurements from the pressure sensor 504 are provided to an electronics/communication module 508 (e.g., a remote telemetry unit or "RTU") via electrical wiring. The electronics/communication module 508 processes the pressure measurements from the pressure sensor 504 and/or forwards the pressure measurements to a remote computer for processing. For example, the differential pressure (the level) for tank 102 may be calculated as: $DP = P_{HI} + E_{HI} - (P_{LO} + E_{LO})$, where $P_{HI}$ is the pressure at the HI port of the tank 102, $E_{HI}$ is the measurement error in $P_{HI}$, $P_{LO}$ is the pressure at the LO port of the tank 102, and $E_{LO}$ is the measurement error in $P_{LO}$. Because the same pressure sensor 504 is used to determine $P_{HI}$ and $P_{LO}$, the error in the DP calculation cancels out and accuracy improves.

In addition to providing an accurate level calculation for the tank 102, the cost of pressure sensor configuration 500 is reduced compared to pressure sensor configurations 100, 200, and 400, since only one sensor is used. Further, the pressure sensor configuration 500 is not subject to damage by improper connection to tank 102 as is pressure sensor configuration 300.

Figure 6:
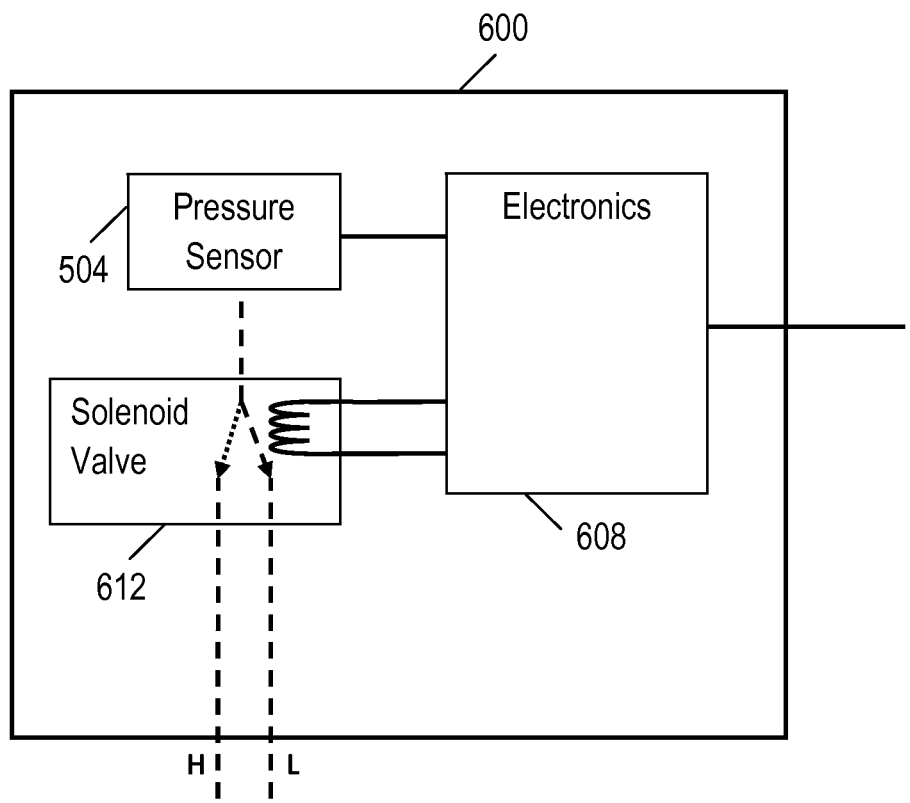
FIG. 6 shows a switchable pressure sensor (SPS) unit in accordance with an embodiment of the disclosure.

FIG. 6 shows an SPS unit 600 (e.g., corresponding to SPS unit 510) in accordance with an embodiment of the disclosure. The SPS unit 600 comprises the pressure sensor 504 and a solenoid valve 612 controlled by electronics 608. The electronics 608 may correspond to a micro-controller and/or other circuitry. In response to a control signal from the electronics 608, the solenoid valve 612 is configured to switch the pressure piping connection for the pressure sensor 504 between a first port (e.g., a HI port) and a second port (e.g., a LO port). In this manner, the pressure sensor 504 is able to provide a reading of the pressure for each of multiple ports of a tank.

Figure 7A:
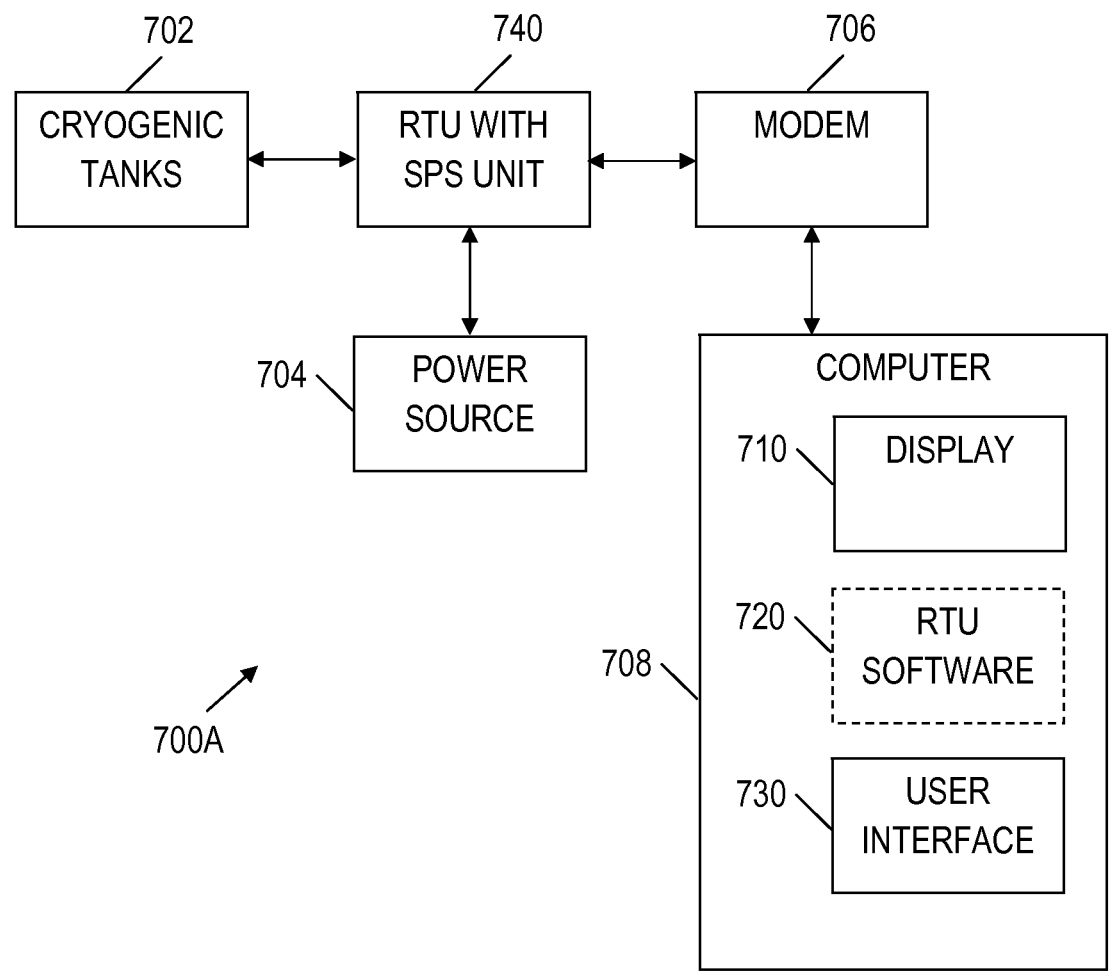
FIGS. 7A-7B show systems in accordance with an embodiment of the disclosure.

FIG. 7A shows a system 700A in accordance with an embodiment of the disclosure. As shown, the system 700A comprises a remote telemetry unit (RTU) 740 with an SPS unit. In at least some embodiments, the RTU 740 further comprises a manifold (not shown) that enables the RTU 740 to be mounted to a flat surface (e.g., a wall or fence) or a rounded surface (e.g., a pole or tank exterior). The manifold may comprise, for example, an anodized aluminum base with process connections, a solenoid connection, a sensor connection, an electrical connection, threaded mounting holes, and a vent. The RTU 740 may further comprise a weatherproof covering (not shown) for its internal components. In at least some embodiments, the RTU 740 measures level and pressure for one or more (e.g., up to 4 tanks for 1 RTU) cryogenic storage tanks. The RTU 740, for example, may be Modbus® master to sensor inputs.

The cost of implementing the SPS unit with RTU 740 is significantly lower than implementing a dual sensor configuration (e.g., pressure sensor configurations 100, 200 and 400), yet it provides both highly accurate level and pressure information. Further, the pressure sensor of the SPS unit is not susceptible to damage by incorrect user connection to tank pressure as are the differential pressure sensors of pressure sensor configurations 100, 200 and 300.

As shown, the RTU 740 couples to a power source 704, which may correspond to a solar panel, a battery and/or an AC power input. In system 700A, the RTU 740 communicates with one or more cryogenic tanks 702. For example, RTU 740 may receive static pressure inputs from each cryogenic tank 702. Further, the RTU 740 may switch the tank port from which the static pressure input is received by controlling a solenoid valve or another switching mechanism. In this manner, the RTU 740 may compute a differential pressure for each cryogenic tank 702 and/or provide the pressure readings needed to calculate the differential pressure to another entity.

In at least some embodiments, the RTU 740 is configured to compute the volume of liquid in each cryogenic tank 702. This is accomplished based on knowledge of tank size and physical properties of the liquid being stored in each cryogenic tank 702. Various parameters (e.g., differential pressure, level, volume and/or mass) of liquid in each cryogenic tank 702 may be displayed by the RTU 740 (e.g., using an LCD or other display). The display of information may be continual or in response to a user request (e.g., pushing one or more buttons on the RTU 740).

In at least some embodiments, RTU 740 combines up-to-the-minute accuracy in cryogenic product level and pressure measurement with a communications system that optimizes inventory management and product delivery cycles. The RTU 740 may, for example, calculate the level of product inside a tank 702 using pressure measurements from its integral sensor and/or 4-20 mA inputs, and store the information in data logs. The logged data may be transmitted directly to a user's computer for viewing and/or printing, without requiring downloads from a website or third-party data host. Further, built-in alarms for the RTU 740 may alert an operator when a parameter falls below a user-specified threshold (e.g., when differential pressure or a corresponding volume falls below a predetermined threshold). An operator can also run a status report "on demand" for instantaneous data monitoring. Thus, the RTU 740 can provide continuous monitoring and an alarm system to help eliminate the risk of running out of product. The RTU 740 also minimizes the need for "extra" product deliveries to ensure that tank levels do not become critically low. For scenarios where multiple chemicals and/or multiple storage sites are managed and/or scenarios where a constant supply of cryogenic gas is critical (e.g., healthcare services), the RTU 740 is highly practical and cost-efficient. Data stored or calculated by the RTU 740 (tank level and pressure measurements) may be transmitted via landline or cellular communications (e.g., both CSD and GPRS communications are supported) to a remote computing system.

As an example, the system 700A is shown to comprise a computer 708 coupled to the RTU 740 via a modem 706. The modem 706 may be, for example, a landline modem or cellular modem. The computer 708 comprises a display 710 (e.g., an LCD display), a user interface 730 (e.g., a touchscreen, a touchpad, a keyboard, a mouse and/or other input devices), and RTU software 720 for use with RTU 740. In at least some embodiments, the RTU software 720 provides a comprehensive set of controls for configuring RTU 740, customizing data management functions, and generating reports from a single host computer.

In at least some embodiments, the RTU software 720 supports remote monitoring of tank parameters based on RTU management instructions, modem interface instructions, and a database file. The RTU management instructions, when executed, enable setup of RTU 740, report generation (tabular and graphical), alarm viewing, alarm acknowledgment, and RTU condition summaries. The modem interface instructions, when executed, enable communications between computer 708 and RTU 740 via modem 706. In at least some embodiments, information received from the RTU 740 is automatically saved to a hard drive or other data storage option for the computer 708. The database file stores information such as RTU configurations, customer data, and RTU status information received while the RTU software 720 is executed. Individual RTU data log files may be stored, for example, on a hard drive or other data storage option for the computer 708.

Various user functions for the RTU are supported by execution of the RTU software 720. Such user function include, but are not limited to, configuring the RTU 740 for GPRS communications, configuring RTU parameters (e.g., alarm setpoints, datalog intervals), viewing and graphing measurement data (e.g., level, pressure, ambient temperature, values of 4-20 mA and contact inputs, 4-20 mA output values), establishing and maintaining an RTU customer database, storing information (e.g., setup, user, product, RTU/tank, customer, and input/output information) in a single file on the computer 708, manually polling the RTU 740 (via modem or internet), and configuring automatic polling of RTUs. Polling options include polling all RTUs associated with the RTU software 720, polling an RTU sub-group, or polling based on an RTU characteristic. In some embodiments, user functions related to the RTU software 720 may further include, but are not limited to, viewing and printing RTU status information, viewing and acknowledging alarms, and printing an alarm history.

In some embodiments, the RTU software 720 implements a security system. For example, a three-level security system may be implemented to prevent unauthorized changes to RTU parameters and settings. System administrators (Level A) have full access and can setup and change users and user passwords. Senior operators (Level B) can add/configure RTUs, acknowledge alarms, and change commonly used parameters. Basic operators (Level C) can view screens and current measurements, poll an RTU, and acknowledge alarms.

In at least some embodiments, the RTU software 720 supports polling communications to and from an RTU. For example, a user can poll a selected RTU manually or poll a group of RTUs automatically in accordance with a pre-set schedule. Once the RTU software 720 connects to an RTU, the RTU software 720 causes any pending configuration changes to the RTU and receives alarm status, captured measurements, and other information stored in the RTU since the last polling. Measurement data received is stored in individual RTU log files on the host PC hard drive or other storage option for the computer 708.

Figure 7B:
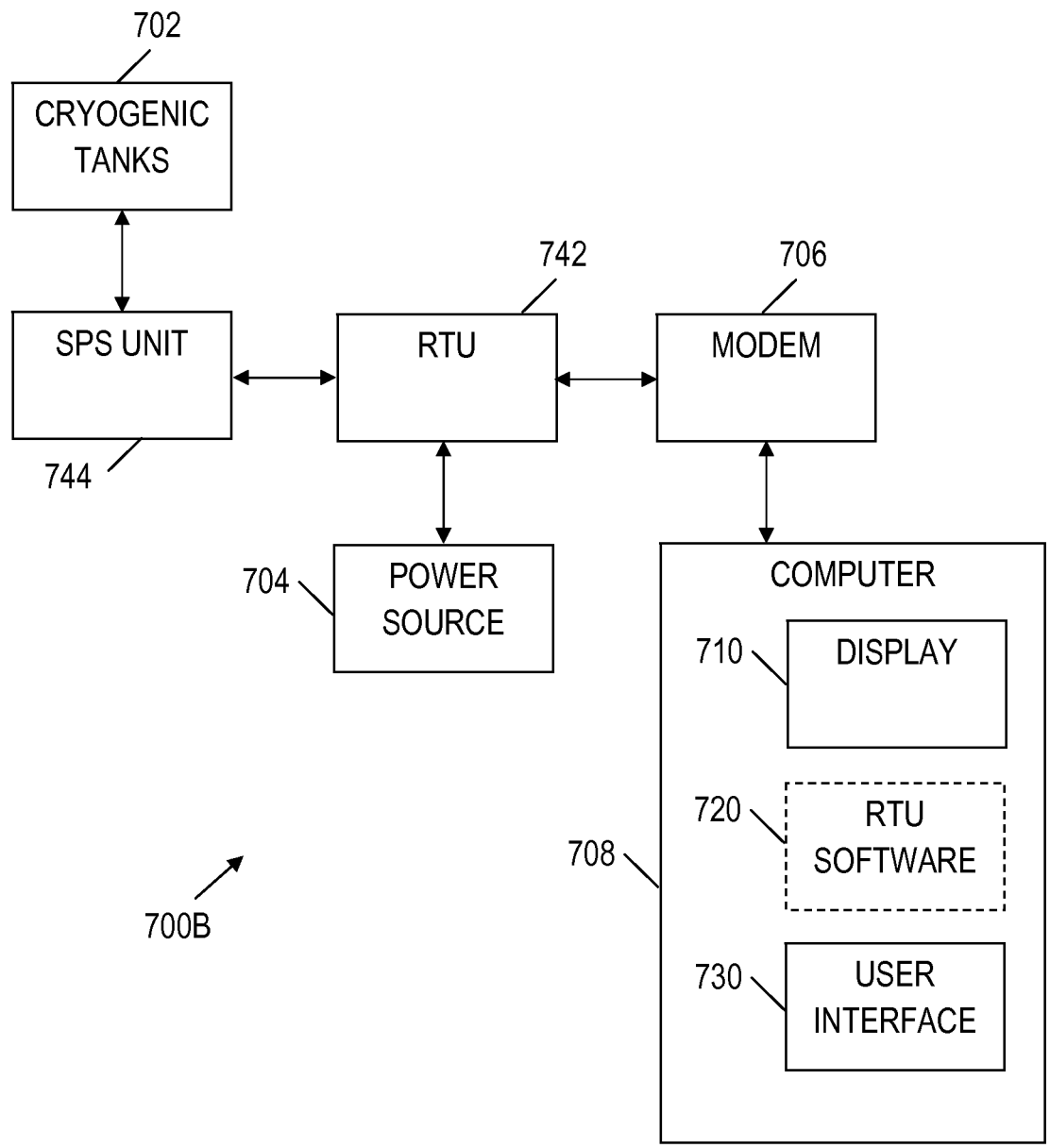

FIG. 7B shows a system 700B in accordance with another embodiment of the disclosure. The system 700B is similar to system 700A, except that RTU 742 does not include the SPS unit as does RTU 740. Instead, RTU 742 couples to SPS unit 744 comprising, for example, a pressure sensor, a solenoid valve, and electronics. The control features, storage features, logging features, communication features, and other operations of RTU 740 described for system 700A are applicable for RTU 742 of system 700B.

Figure 8:
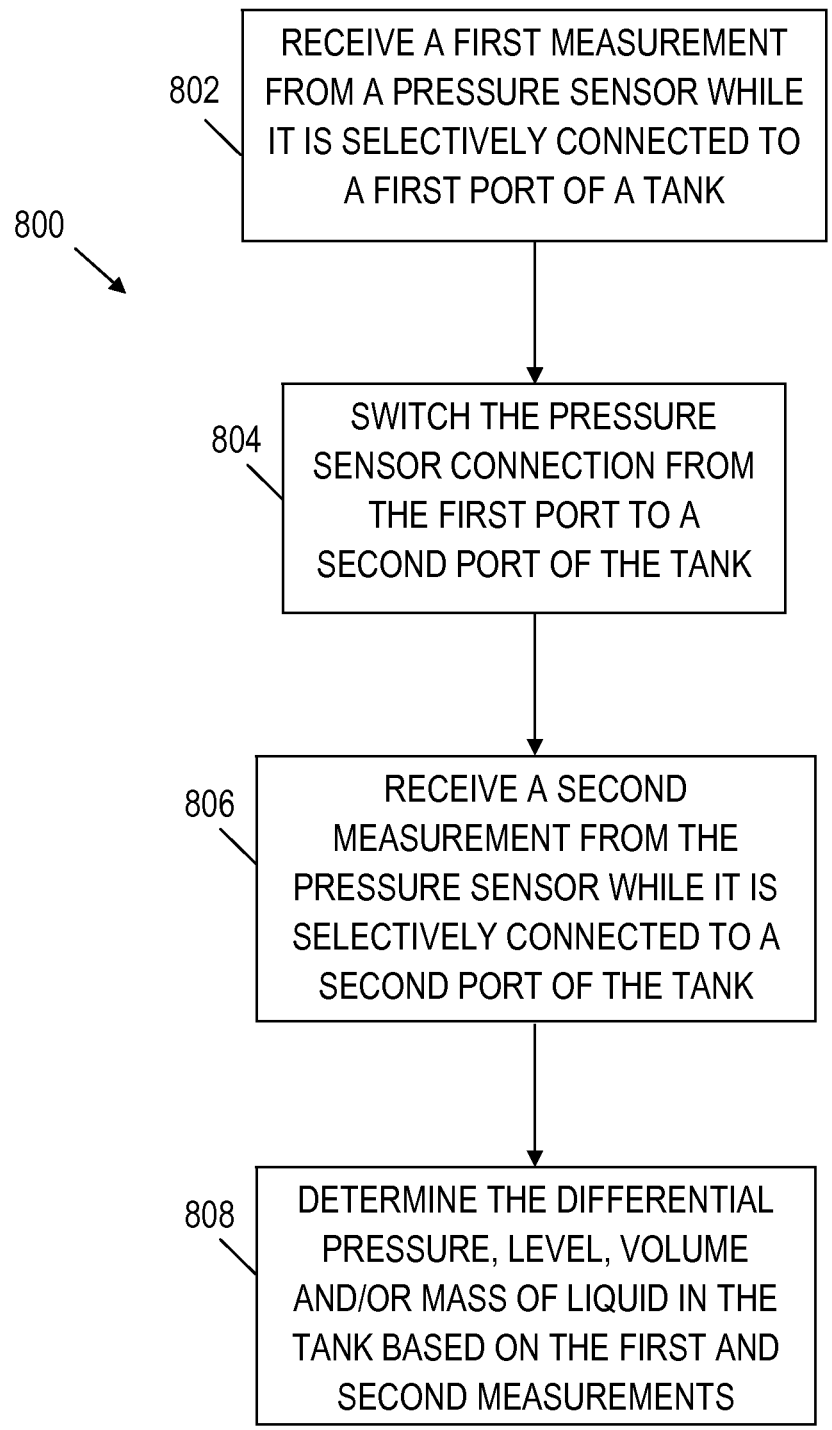
FIG. 8 shows a method to determine a volume of liquid in a pressurized liquid storage tank in accordance with an embodiment of the disclosure.

FIG. 8 shows a method 800 to determine the volume of liquid in a pressurized liquid storage tank in accordance with an embodiment of the disclosure. The method 800 comprises receiving a first measurement from a pressure sensor while it is selectively connected to a first port of a tank (block 802). At block 804, the pressure sensor connection is switched from the first port to a second port of the tank. At block 806, a second measurement is received from the pressure sensor while it is selectively connected to a second port of the tank. A volume of liquid in the tank is determined based on the first and second measurements (block 808). To determine the level, volume or mass of liquid, a differential pressure is calculated from the first and second measurements. Then, the level, volume and/or mass is determined using the differential pressure calculation, the tank geometry, and known physical properties of the liquid being stored.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, SPS unit electronics (instead of RTU electronics) could control switching the solenoid valve and performing calculations such as subtracting pressure sensor measurements to determine level (differential pressure) of a tank.

For example, the relative dimensions of various parts, the materials from which the various parts are made, and other parameters can be varied, so long as the override apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A pressure sensor configuration, comprising:
 a pressure sensor; and
 a switchable valve coupled to the pressure sensor, the switchable valve enabling the pressure sensor to measure pressure at multiple ports of a pressurized tank.

2. The pressure sensor configuration of claim 1 wherein the switchable valve comprises a solenoid valve.

3. The pressure sensor configuration of claim 1 further comprising a controller in communication with the pressure sensor, wherein the controller receives pressure measurements from the pressure sensor and stores the pressure measurements.

4. The pressure sensor configuration of claim 1 further comprising a controller in communication with the pressure sensor, wherein the controller receives pressure measurements from the pressure sensor and calculates a differential pressure for the pressurized tank.

5. The pressure sensor configuration of claim 1 further comprising a controller in communication with the pressure sensor, wherein the controller receives pressure measurements from the pressure sensor and calculates a volume of liquid for the pressurized tank.

6. The pressure sensor configuration of claim 1 further comprising a controller in communication with the switchable valve, wherein the controller selectively directs the switchable valve to switch between a first pressure piping connection and a second pressure piping connection.

7. The pressure sensor configuration of claim 1 further comprising a controller in communication with the pressure sensor, wherein the controller calculates a differential pressure between HI and LO ports of the pressurized tank based on measurements from the pressure sensor and transmits the calculated differential pressure to a remote computing system.

8. The pressure sensor configuration of claim 7 wherein the controller calculates at a volume of liquid stored by the pressurized tank based on the differential pressure calculation and transmits the calculated volume to a remote computing system.

9. The pressure sensor configuration of claim 1 wherein the pressure sensor configuration is part of a switchable pressure sensor (SPS) unit with electronics to control the switchable valve and determine a differential pressure for the pressurized tank.

10. The pressure sensor configuration of claim 1 wherein the pressure sensor configuration is part of a remote telemetry unit (RTU) with electronics to control the switchable valve and determine a differential pressure for the pressurized tank.

11. A remote telemetry unit (RTU), comprising:
a pressure sensor; and
a solenoid valve coupled to the pressure sensor, wherein the RTU operates the solenoid valve in conjunction with measurements of the pressure sensor to determine a differential pressure of a pressurized tank.

12. The RTU of claim 11 further comprising a controller in communication with the pressure sensor, wherein the controller receives pressure measurements from the pressure sensor and calculates the differential pressure.

13. The RTU of claim 12 wherein the controller calculates a volume of liquid in the pressurized tank based on the calculated differential pressure.

14. The RTU of claim 13 further comprising a display coupled to the controller, wherein the controller causes the calculated volume to be displayed on the display.

15. The RTU of claim 12 further comprising a first pressure piping connection and a second pressure piping connection, wherein the controller selectively directs the solenoid valve to switch between the first and second pressure piping connections.

16. The RTU of claim 12 wherein the controller calculates the differential pressure between HI and LO ports of the pressurized tank based on measurements from the pressure sensor and transmits the calculated differential pressure to a remote computing system.

17. The RTU of claim 11 wherein RTU features are configurable from a remote computing system.

18. The RTU of claim 17 wherein the RTU features comprise an alarm activated if a parameter monitored by the RTU falls below a user-specified threshold.

19. A method, comprising:
receiving, by a switchable pressure sensor (SPS) unit, a first measurement from a pressure sensor while connected to a first pressure pipe connection;
receiving, by the SPS unit, a second measurement from the pressure sensor while connected to a second pressure pipe connection; and
calculating a differential pressure based on the first and second measurements.

20. The method of claim 19 wherein said calculating is preformed by the SPS unit.

21. The method of claim 19 wherein said calculating is performed by a remote telemetry unit (RTU) in communication with the SPS unit.

22. The method of claim 19 wherein switching the pressure sensor connection comprises operating a solenoid valve after the first measurement and before the second measurement.

* * * * *